(12) United States Patent
Cherry et al.

(10) Patent No.: US 7,340,318 B1
(45) Date of Patent: Mar. 4, 2008

(54) METHOD AND APPARATUS FOR ASSESSING CONTROLLER PERFORMANCE

(75) Inventors: Gregory A. Cherry, Austin, TX (US); Ernest D. Adams, III, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 707 days.

(21) Appl. No.: 10/325,611

(22) Filed: Dec. 20, 2002

(51) Int. Cl.
*G06F 19/00* (2006.01)

(52) U.S. Cl. .................. 700/109; 700/30; 700/51; 700/121; 700/174

(58) Field of Classification Search ............... 700/19, 700/28–31, 51, 52, 56–59, 79, 91, 93, 96, 700/108–109, 119–125, 173–177
See application file for complete search history.

(56) References Cited

U.S. PATENT DOCUMENTS

| | | | |
|---|---|---|---|
| 5,719,796 A * | 2/1998 | Chen ..................... 364/578 |
| 6,133,582 A * | 10/2000 | Osann, Jr. et al. ............ 257/48 |
| 6,161,054 A * | 12/2000 | Rosenthal et al. .......... 700/121 |
| 6,249,712 B1 * | 6/2001 | Boiquaye ..................... 700/31 |
| 6,303,395 B1 * | 10/2001 | Nulman ....................... 438/14 |
| 6,379,980 B1 * | 4/2002 | Toprac ........................ 438/8 |
| 6,387,823 B1 * | 5/2002 | Sonderman et al. ........ 438/758 |

* cited by examiner

*Primary Examiner*—Leo Picard
*Assistant Examiner*—Sean Shechtman
(74) *Attorney, Agent, or Firm*—Williams, Morgan & Amerson, P.C.

(57) ABSTRACT

A method includes providing a process controller for controlling a process tool. The process tool is controlled in accordance with a process parameter. Measurements associated with the processing parameter for a plurality of runs of the process tool are accessed. A performance measure for the process controller is generated based on the process parameter and the measurements. A system includes a process tool, a process controller, and a performance monitor. The process controller is configured to control the process tool in accordance with a process parameter. The performance monitor is configured to retrieve measurements associated with the processing parameter for a plurality of runs of the process tool and generate a performance measure for the process controller based on the measured processing parameters.

8 Claims, 3 Drawing Sheets

METHOD AND APPARATUS FOR ASSESSING CONTROLLER PERFORMANCE

BACKGROUND OF THE INVENTION

1. Field of the Invention

This invention relates generally to the field of semiconductor device manufacturing and, more particularly, to a method and apparatus for assessing controller performance.

2. Description of the Related Art

There is a constant drive within the semiconductor industry to increase the quality, reliability and throughput of integrated circuit devices, e.g., microprocessors, memory devices, and the like. This drive is fueled by consumer demands for higher quality computers and electronic devices that operate more reliably. These demands have resulted in a continual improvement in the manufacture of semiconductor devices, e.g., transistors, as well as in the manufacture of integrated circuit devices incorporating such transistors. Additionally, reducing the defects in the manufacture of the components of a typical transistor also lowers the overall cost per transistor as well as the cost of integrated circuit devices incorporating such transistors.

Generally, a set of processing steps is performed on a lot of wafers using a variety of process tools, including photolithography steppers, etch tools, deposition tools, polishing tools, rapid thermal process tools, implantation tools, etc. The technologies underlying semiconductor process tools have attracted increased attention over the last several years, resulting in substantial refinements. However, despite the advances made in this area, many of the process tools that are currently commercially available suffer certain deficiencies. In particular, such tools often lack advanced process data monitoring capabilities, such as the ability to provide historical parametric data in a user-friendly format, as well as event logging, real-time graphical display of both current processing parameters and the processing parameters of the entire run, and remote, i.e., local site and worldwide, monitoring. These deficiencies can engender non-optimal control of critical processing parameters, such as throughput, accuracy, stability and repeatability, processing temperatures, mechanical tool parameters, and the like. This variability manifests itself as within-run disparities, run-to-run disparities and tool-to-tool disparities that can propagate into deviations in product quality and performance, whereas an ideal monitoring and diagnostics system for such tools would provide a means of monitoring this variability, as well as providing means for optimizing control of critical parameters.

One technique for improving the operation of a semiconductor processing line includes using a factory wide control system to automatically control the operation of the various process tools. The manufacturing tools communicate with a manufacturing framework or a network of processing modules. Each manufacturing tool is generally connected to an equipment interface. The equipment interface is connected to a machine interface that facilitates communications between the manufacturing tool and the manufacturing framework. The machine interface can generally be part of an advanced process control (APC) system. The APC system initiates a control script based upon a manufacturing model, which can be a software program that automatically retrieves the data needed to execute a manufacturing process. Often, semiconductor devices are staged through multiple manufacturing tools for multiple processes, generating data relating to the quality of the processed semiconductor devices.

During the fabrication process various events may take place that affect the performance of the devices being fabricated. That is, variations in the fabrication process steps result in device performance variations. Factors, such as feature critical dimensions, doping levels, contact resistance, particle contamination, etc., all may potentially affect the end performance of the device. Various tools in the processing line are controlled in accordance with performance models to reduce processing variation. Commonly controlled tools include photolithography steppers, polishing tools, etching tools, and deposition tools. Pre-processing and/or post-processing metrology data is supplied to process controllers for the tools. Operating recipe parameters, such as processing time, are calculated by the process controllers based on the performance model and the metrology information to attempt to achieve post-processing results as close to a target value as possible. Reducing variation in this manner leads to increased throughput, reduced cost, higher device performance, etc., all of which equate to increased profitability.

Target values for the various processes performed are generally based on design values for the devices being fabricated. For example, a particular process layer may have a target thickness. Operating recipes for deposition tools and/or polishing tools may be automatically controlled to reduce variation about the target thickness. In another example, the critical dimensions of a transistor gate electrode may have an associated target value. The operating recipes of photolithography tools and/or etch tools may be automatically controlled to achieve the target critical dimensions.

Typically, a control model is used to generate control actions for changing the operating recipe settings for a process tool being controlled based on feedback or feedforward metrology data collected related to the processing by the process tool. A control model typically includes one or more configurable controller tuning parameters. Exemplary tuning parameters include gain factors that are applied to feedback or feedforward metrology data or weight factors that are applied to current and historical metrology data for data smoothing techniques. Values for the tuning parameters may be calculated or determined empirically. The efficacy of the process controller depends in great part on the optimization of the tuning parameters. For example, an aggressive control model may react quickly to deviations from target, while a more conservative model may react more slowly. The configurable control model parameters define the nature of the control model response.

There are various sources of variation in a semiconductor manufacturing process. Not all of these sources may be easily accounted for in a single control model. Moreover, the control model parameters may be well suited for controlling one type of variation, but inadequate for controlling another.

The present invention is directed to overcoming, or at least reducing the effects of, one or more of the problems set forth above.

SUMMARY OF THE INVENTION

One aspect of the present invention is seen in a method that includes providing a process controller for controlling a process tool. The process tool is controlled in accordance with a process parameter. Measurements associated with the processing parameter for a plurality of runs of the process tool are accessed. A performance distribution for the process controller is generated based on the process parameter and the measurements.

Another aspect of the present invention is seen in a system including a process tool, a process controller, and a performance monitor. The process controller is configured to control the process tool in accordance with a process parameter. The performance monitor is configured to retrieve measurements associated with the processing parameter for a plurality of runs of the process tool and generate a performance measure for the process controller based on the measured processing parameters.

BRIEF DESCRIPTION OF THE DRAWINGS

The invention may be understood by reference to the following description taken in conjunction with the accompanying drawings, in which like reference numerals identify like elements, and in which.

Figure 1:
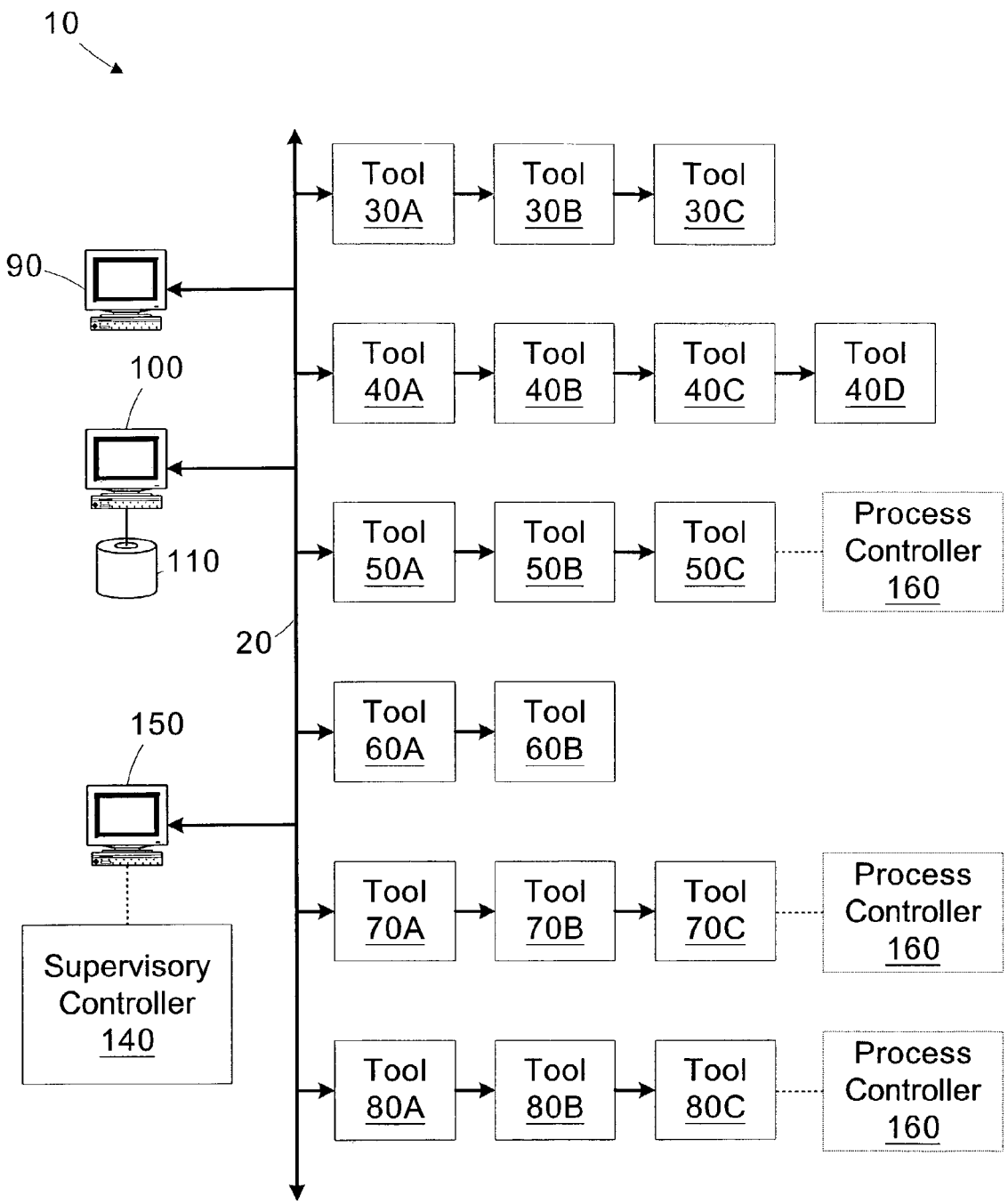
FIG. 1 is a simplified block diagram of a manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to FIG. 1, a simplified block diagram of an illustrative manufacturing system 10 is provided. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices.

A network 20 interconnects various components of the manufacturing system 10, allowing them to exchange information. The illustrative manufacturing system 10 includes a plurality of tools 30-80. Each of the tools 30-80 may be coupled to a computer (not shown) for interfacing with the network 20. The tools 30-80 are grouped into sets of like tools, as denoted by lettered suffixes. For example, the set of tools 30A-30C represent tools of a certain type, such as a chemical mechanical planarization tool. A particular wafer or lot of wafers progresses through the tools 30-80 as it is being manufactured, with each tool 30-80 performing a specific function in the process flow. Exemplary processing tools for a semiconductor device fabrication environment include metrology tools, photolithography steppers, etch tools, deposition tools, polishing tools, rapid thermal processing tools, implantation tools, etc. The tools 30-80 are illustrated in a rank and file grouping for illustrative purposes only. In an actual implementation, the tools 30-80 may be arranged in any physical order or grouping. Additionally, the connections between the tools in a particular grouping are meant to represent connections to the network 20, rather than interconnections between the tools 30-80.

A manufacturing execution system (MES) server 90 directs high level operation of the manufacturing system 10. A manufacturing execution system (MES) server 90 directs the high level operation of the manufacturing system 10. The MES server 90 monitors the status of the various entities in the manufacturing system 10 (i.e., lots, tools 30-80) and controls the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, etc.

Portions of the invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The manufacturing system 10 also includes a performance monitor 140 executing on a workstation 150. The performance monitor 140 evaluates the performance of one or more of the process controllers 160 associated with individual tools 30-80. The process controllers 160 determine control actions for controlling selected ones of the tools 30-80 serving as process tools based on metrology data collected during the fabrication of wafers (i.e., by others of the tools 30-80 serving as metrology tools). The particular control models used by the process controllers 160 depend on the type of tool 30-80 being controlled. The control models may be developed empirically using commonly known linear or non-linear techniques. The control models may be relatively simple equation-based models (e.g., linear, exponential, weighted average, etc.) or a more complex model, such as a neural network model, principal component analysis (PCA) model, partial least squares projection to latent structures (PLS) model. The specific implementation of the control models may vary depending on the modeling techniques selected and the process being controlled. The selection and development of the particular control models would be within the ability of one of ordinary skill in the art, and accordingly, the control models are not described in greater detail herein for clarity and to avoid obscuring the instant invention.

An exemplary information exchange and process control framework suitable for use in the manufacturing system 10 is an Advanced Process Control (APC) framework, such as may be implemented using the Catalyst system offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif.

The processing and data storage functions are distributed amongst the different computers or workstations in FIG. 1 to provide general independence and central information storage. Of course, different numbers of computers and different arrangements may be used without departing from the spirit and scope of the instant invention.

The performance monitor 140 assesses the performance of the process controllers 160 using a variety of measures. One goal of the process controller 160 is to determine recipe settings for its associated tool 30-80 to reduce the deviation observed in an output characteristic of a processed wafer. In a feedback mode of operation, the process controller 160 compares an established process target against metrology data collected after completion of the processing and adjusts one or more recipe parameters to reduce the error for a subsequent processing run. For example, a process controller 160 may be provided for controlling a critical dimension (CD) of a transistor gate electrode. The performance monitor 140 may use metrology data collected for the CD to gauge the performance of the process controller 160. The ability of the process controller 160 to meet its process target may be reduced depending on factors such as model mismatch, tool faults, metrology and process tool drift, etc.

The process controller 160 provides operating recipes to the tool 30-80 based on the control actions derived from its control model. Factors, such as the health of the tool 30-80, may affect its ability to achieve the specified recipe parameter(s) during the processing run. For example, if the process controller 160 specifies a particular pressure or temperature, the tool 30-80 may not always achieve that exact parameter value. The error in the ability of the tool 30-80 to achieve the specified recipe parameter may result in a deviation in the output characteristic measured for the processed wafer.

Hence, the performance of a particular process controller 160 depends not only on its ability to determine recipe parameters to address variation in the output characteristic (i.e., target error), but also on the ability of the tool 30 to achieve the specified recipe parameters (i.e., recipe parameter error). The target errors and the recipe parameter errors may be collectively referred to as process parameter errors.

Figure 2:
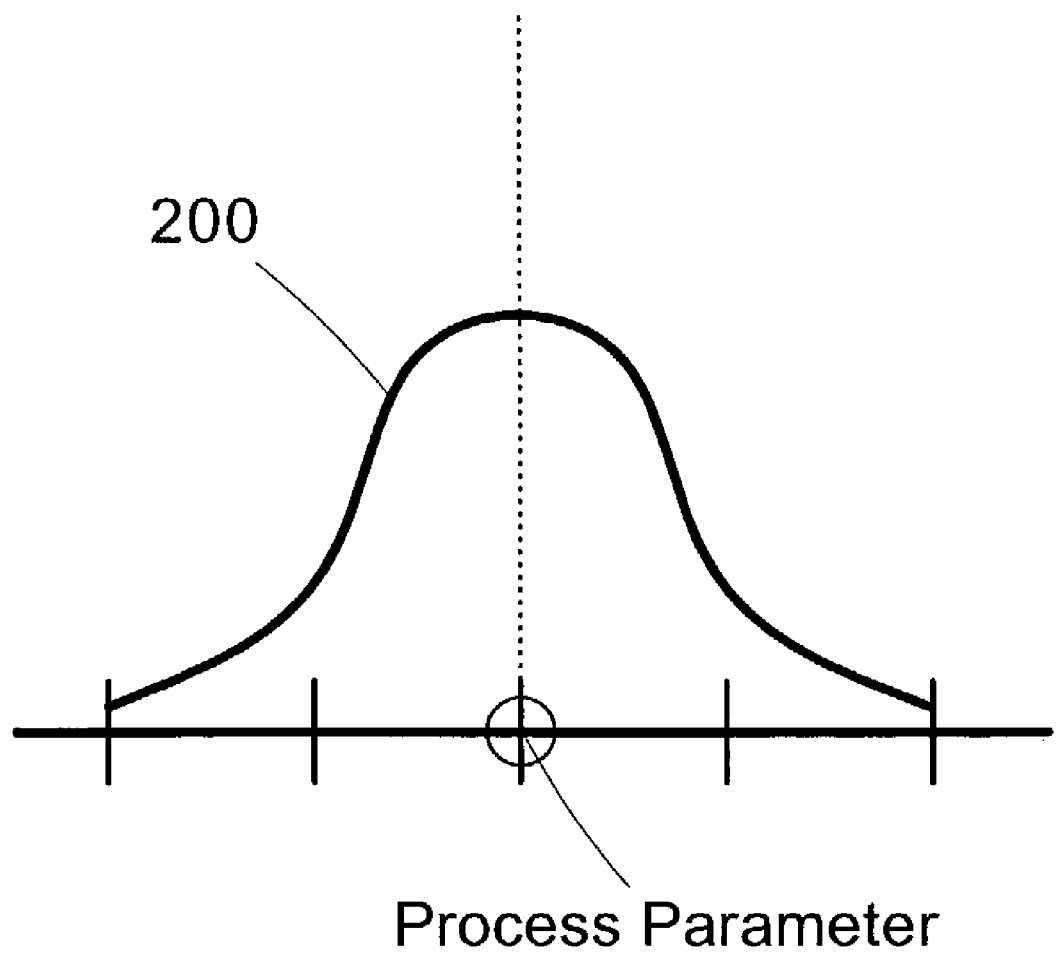
FIG. 2 illustrates a distribution representing the performance of a process controller in the manufacturing system of FIG. 1.

The performance monitor 140 monitors process parameter errors associated with the process controller 160 to assess its performance. Referring briefly to FIG. 2, a graph illustrating the performance of one of the process controllers 160 is provided. The performance monitor 140 generates a distribution 200 representing the likelihood of the process parameter being met. For example, if process parameter is the output characteristic of the processed wafers (e.g., gate electrode CD), the distribution 200 represents the likelihood that the process target will be achieved. In a case where the processing parameter is one of the recipe parameters specified by the process controller 160, the distribution represents the likelihood that the tool 30-80 will achieve the specified recipe parameter. Because, the recipe parameter is expected to change, the distribution 200 may be calculated by normalizing the recipe parameter and generating the distribution based on percentage deviation from the expected recipe parameter. The performance monitor 140 may determine multiple distributions 200 for different output characteristics and different recipe parameters.

The performance monitor 140 may use the various distributions 200 determined to characterize observed deviations. For example, if a problem is identified with a target distribution, the performance monitor 140 may evaluate the recipe parameter distribution to identify whether the target deviation is likely to a modeling error or a tool error. If the target deviation results mostly from a modeling deviation, the controller tuning parameters of the process controller's 160 control model may be adjusted. If the target deviation results mostly from a tool deviation, maintenance may be scheduled for the tool 30-80.

Figure 3:
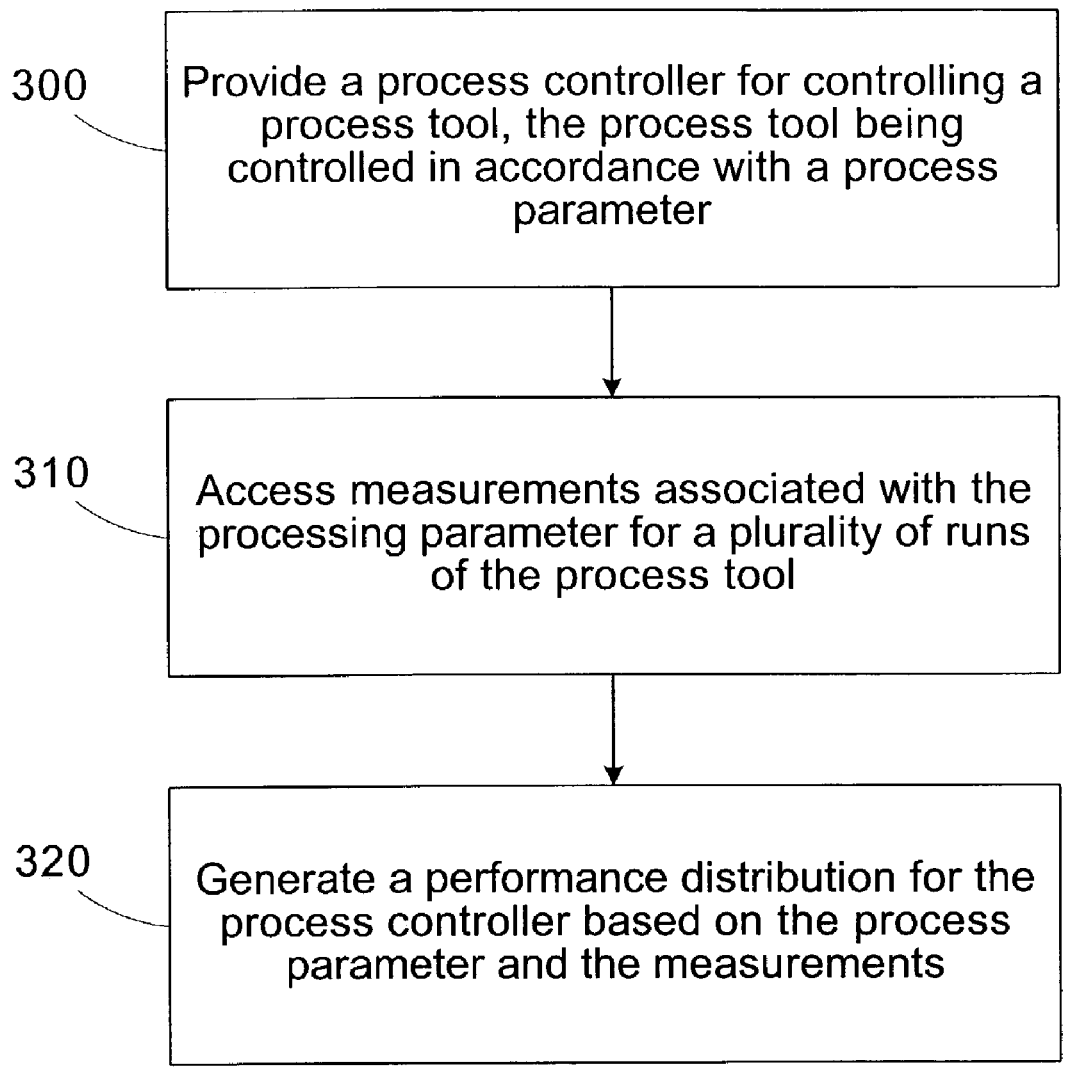
FIG. 3 is a simplified flow diagram of a process for assessing controller performance in accordance with another implementation of the present invention.

Turning now to FIG. 3, a simplified flow diagram of a process for assessing controller performance in accordance with another implementation of the present invention is provided. In block 300, a process controller for controlling a process tool is provided. The process tool is controlled in accordance with a process parameter. In block 310, measurements associated with the processing parameter for a plurality of runs of the process tool are accessed. In block 320, a performance distribution for the process controller is generated based on the process parameter and the measurements.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising
   providing a process controller for controlling a process tool, the process tool being controlled in accordance with a process parameter wherein the process parameter comprises a recipe parameter specified by the process controller for use by the process tool;

accessing measurements associated with the processing parameter for a plurality of runs of the process tool, collected during a plurality of runs of the process tool wherein accessing the measurements further comprises accessing measurements of the processing parameter collected during the runs of the process tool; and generating a first performance distribution for the process controller based on the process parameter and the measurements by comparing the measured recipe parameter to the recipe parameter provided by the process controller and generating a performance distribution representing the likelihood that the process tool will achieve the recipe parameter provided by the process controller.

2. The method of claim 1, wherein the process parameter comprises a process target, and accessing the measurements further comprises accessing measurements of an output characteristic of workpieces processed by the process tool.

3. The method of claim 2, wherein generating the performance distribution further comprises comparing the measured output characteristics to the process target and generating a second performance distribution representing the likelihood that the process controller will achieve the process target.

4. The method of claim 1, wherein generating the first performance distribution further comprises normalizing the measured recipe parameter and the recipe parameter provided by the process controller and generating the performance distribution based on a percentage deviation in the normalized recipe parameters.

5. A system comprising:

a process tool;

a process controller configured to control the process tool in accordance with a process parameter, wherein the process parameter comprises a recipe parameter specified by the process controller for use by the process tool; and a performance monitor configured to retrieve measurements associated with the processing parameter collected during a plurality of runs of the process tool, wherein the measurements further comprise measurements of the processing parameter collected during the runs of the process tool, and generate a first performance distribution for the process controller based on the measured processing parameters by comparing the measured recipe parameter to the recipe parameter provided by the process controller and generate the first performance distribution as a first performance distribution representing the likelihood that the process tool will achieve the recipe parameter provided by the process controller.

6. The system of claim 5, wherein the process parameter comprises a process target, and the measurements further comprise measurements of an output characteristic of workpieces processed by the process tool.

7. The system of claim 6, wherein the performance monitor is further configured to compare the measured output characteristics to the process target and generate a second performance distribution representing the likelihood that the process controller will achieve the process target.

8. The system of claim 5, wherein the performance monitor is configured to normalize the measured recipe parameter and the recipe parameter provided by the process controller and generate the first performance distribution based on a percentage deviation in the normalized recipe parameters.

* * * * *